(12) United States Patent
Kauchak et al.

(10) Patent No.: US 8,401,899 B1
(45) Date of Patent: Mar. 19, 2013

(54) GROUPING USER FEATURES BASED ON PERFORMANCE MEASURES

(75) Inventors: David Robert Kauchak, San Mateo, CA (US); Richard Edward Chatwin, Sunnyvale, CA (US)

(73) Assignee: Adchemy, Inc., Redwood City, CA (US)

( * ) Notice: Subject to any disclaimer, the term of this patent is extended or adjusted under 35 U.S.C. 154(b) by 681 days.

(21) Appl. No.: 12/484,846

(22) Filed: Jun. 15, 2009

(51) Int. Cl.
*G06Q 30/00* (2006.01)

(52) U.S. Cl. .............. 705/14.43; 705/14.42; 705/14.52; 705/14.49

(58) Field of Classification Search .............. 705/14.43, 705/14.41, 14.52, 14.49
See application file for complete search history.

(56) References Cited

U.S. PATENT DOCUMENTS

| | | | |
|---|---|---|---|
| 7,406,434 B1 * | 7/2008 | Chang et al. ............... | 705/14.43 |
| 2002/0123928 A1 * | 9/2002 | Eldering et al. ............... | 705/14 |
| 2003/0101449 A1 * | 5/2003 | Bentolila et al. ............... | 725/10 |
| 2006/0259360 A1 * | 11/2006 | Flinn et al. ...................... | 705/14 |
| 2008/0288354 A1 | 11/2008 | Flinn | |
| 2009/0018896 A1 | 1/2009 | McGreal | |
| 2009/0063268 A1 | 3/2009 | Burgess | |
| 2009/0112690 A1 | 4/2009 | Brady | |
| 2010/0030647 A1 * | 2/2010 | Shahshahani ............... | 705/14.66 |
| 2010/0088152 A1 | 4/2010 | Bennett | |
| 2010/0088177 A1 | 4/2010 | Lu | |
| 2010/0114716 A1 * | 5/2010 | Heilig et al. ............... | 705/14.71 |
| 2010/0217648 A1 * | 8/2010 | Agarwal et al. ................ | 705/10 |
| 2011/0106611 A1 | 5/2011 | Chang | |

FOREIGN PATENT DOCUMENTS

EP 0210742 * 2/1987

OTHER PUBLICATIONS

Savaresi et al., A Comparative Analysis on the Bisecting K-Means and PDDP Clustering Algorithms, Intelligent Data Analysis 6, 1-18 IDA174, IOS Press, 2004.
U.S. Appl. No. 12/484,892, filed Jun. 15, 2009.
Office Action for U.S. Appl. No. 12/484,892, Mar. 1, 2012.
D. R. Kauchak, U.S. Appl. No. 12/484,892, USPTO, Amendment after non-final Office Action filed Jun. 1, 2012.

* cited by examiner

*Primary Examiner* — Michael Bekerman
*Assistant Examiner* — Luis Brown
(74) *Attorney, Agent, or Firm* — Baker Botts, L.L.P.

(57) ABSTRACT

In one embodiment, a method includes accessing online advertising data including metric values for one or more online advertising spaces; identifying pairs of the user variables; for each of the pairs, calculating a statistical score for each of the online advertising metrics and calculating a weighted score based on all the statistical scores for the pair; selecting one of the pairs based on its weighted score; and performing a merge test on the selected pair; and merging the user variables in the selected one of the pairs with each other if the selected one of the pairs passes the merge test.

46 Claims, 4 Drawing Sheets

FIG. 1

GROUPING USER FEATURES BASED ON PERFORMANCE MEASURES

TECHNICAL FIELD

The present disclosure generally relates to online advertising.

BACKGROUND

Online advertising exchanges (ad exchanges) allow advertisers to present personalized advertisements to target users based on a range of user features relating to different aspects of the users themselves and the users' activities. The performance of the individual advertisements presented at a particular online space with respect to any given combination of the user features may vary along many different measurements, such as click-through rate, impression-to-conversion rate, revenue per conversion, etc. Advertisers may select different combinations of user features and pay different amounts of advertising costs for different types of targeted advertising.

BRIEF DESCRIPTION OF THE DRAWINGS

FIG. 1 illustrates an example web page with example ad space.

DESCRIPTION OF EXAMPLE EMBODIMENTS

Figure 1:
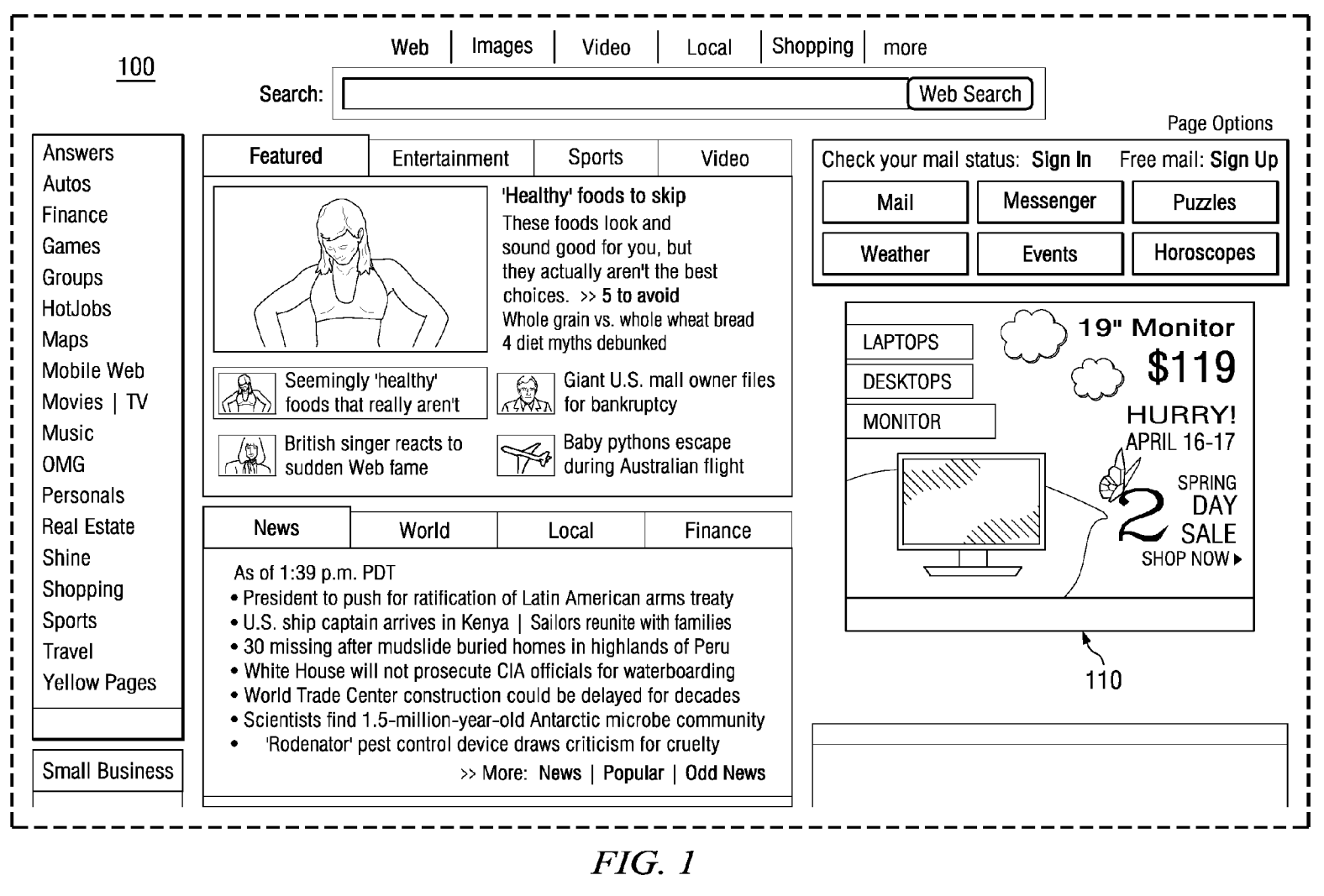

Online advertising advances with the development of the world-wide network system. In particular embodiments, advertisements are placed in online advertising spaces (ad spaces) so that they may be presented to the network users. A typical example of an online ad space is a position in a web page that is used to present various advertisements to the users viewing the web page. FIG. 1 illustrates an example web page 100 having an ad space 110. An advertisement about a monitor is presented in ad space 110. Of course, a web page may contain any number of ad spaces, and each ad space may be used to present different advertisements at different times. Furthermore, ad spaces are not limited to the positions in the web pages. Advertisements may be included in other types of media (such as, for example, e-mail, instant messages (IMs), and blogs) and each position used to present one or more advertisements to online users may be considered an ad space.

Online advertising is increasingly becoming personalized for target users based on various personalization algorithms. Personalized advertising often increases the effectiveness of the advertisements as well as generates higher revenue and saves advertising cost for the advertisers. In particular embodiments, the performance of the advertisements presented in an ad space is monitored and measured over some period of time and the performance data are collected and stored. Each type of performance measurement is represented by a metric having multiple performance values corresponding to the different user features. Those user features having similar performance values across the different types of performance measurements are combined into user feature groups to reduce the possible number of combinations of user features. The advertisers may then select specific combinations of the user features or user feature groups that best suit their individual advertising requirements and pay different advertising costs for different combinations of the user features or user feature groups in connection with personalized advertising.

Figure 2:
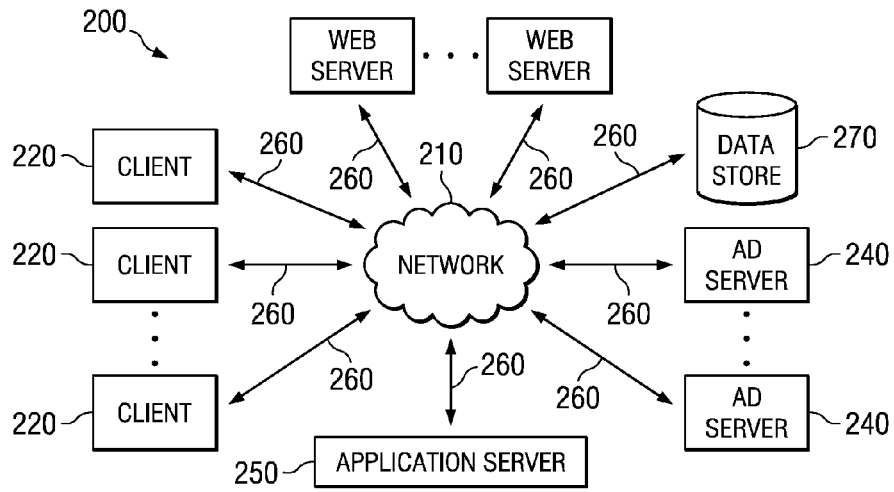
FIG. 2 illustrates an example system for grouping user features based on performance measures.

FIG. 2 illustrates an example system 200 for grouping similar user features based on multiple types of performance measurements. System 200 includes a network 210 coupling one or more clients 220, one or more web servers 230, one or more advertising servers (ad servers) 240, and an application server 250 to each other. Each server may be a unitary server or may be a distributed server spanning multiple computers or multiple datacenters. In particular embodiments, network 210 is an intranet, an extranet, a virtual private network (VPN), a local area network (LAN), a wireless LAN (WLAN), a wide area network (WAN), a metropolitan area network (MAN), a portion of the Internet, or another network 210 or a combination of two or more such networks 210. The present disclosure contemplates any suitable network 210.

One or more links 260 couple a client 220, a web server 230, an ad server 240, or application server 250 to network 210. In particular embodiments, one or more links 260 each includes one or more wireline, wireless, or optical links 260. In particular embodiments, one or more links 260 each includes an intranet, an extranet, a VPN, a LAN, a WLAN, a WAN, a MAN, a portion of the Internet, or another link 260 or a combination of two or more such links 260. The present disclosure contemplates any suitable links 260 coupling clients 220, web servers 230, ad server 240, and application server 250 to network 210.

In particular embodiments, a client 220 enables a user at client 220 to access web pages hosted by web servers 230. As an example and not by way of limitation, a client 220 may be a desktop computer system, a notebook computer system, a netbook computer system, or a mobile telephone having a web browser, such as MICROSOFT INTERNET EXPLORER, GOOGLE CHROME or MOZILLA FIREFOX, which, for example, may have one or more add-ons, plug-ins, or other extensions, such as GOOGLE TOOLBAR or YAHOO TOOLBAR. The present disclosure contemplates any suitable clients 220. A user at client 220 may enter a Uniform Resource Locator (URL) or other address directing the web browser to a web server 230, and the web browser may generate a Hyper Text Transfer Protocol (HTTP) request and communicate the HTTP request to web server 230. Web server 230 may accept the HTTP request and communicate to client 220 one or more Hyper Text Markup Language (HTML) files responsive to the HTTP request. Client 220 may render a web page based on the HTML files from web server 230 for presentation to the user. The present disclosure contemplates any suitable web page files. As an example and not by way of limitation, web pages may render from HTML files, Extensible HyperText Markup Language (XHTML) files, or Extensible Markup Language (XML) files, according to particular needs. Such pages may also execute scripts such as, for example and not by way of limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

The present disclosure contemplates any suitable web pages. As an example and not by way of limitation, web pages hosted by web servers 230 may be static or dynamic. In particular embodiments, multiple web pages stored together in a common directory at a web server 230 make up a website or a portion of a website. Herein, reference to a publisher may encompass one or more websites published by the publisher, and vice versa, where appropriate. In particular embodiments, a web page includes one or more elements. As an example and not by way of limitation, presented (or rendered) elements of a web page may include static text, static images, animated images, audio, video, interactive text, interactive illustrations, buttons, hyperlinks, or forms. Such elements may each occupy a particular space on the web page when displayed. Internal (or hidden) elements of a web page may include, for example and not by way of limitation, comments, meta elements, databases, diagramation and style information, and scripts, such as JAVASCRIPT. One or more elements of a web page may be inline frames (IFrames) which enable web developers to embed HTML documents into other HTML documents. Herein, reference to a document may encompass a web page, where appropriate. Reference to an element of a web page may encompass one or more portions of a web page file for rendering the element, and vice versa, where appropriate.

One or more elements of a web page may be advertisements. A position in the web page where an advertisement is placed may be referred to as an ad space. In particular embodiments, an advertisement has various attributes. As an example and not by way of limitation, attributes of an advertisement may include format (such as text, image, video, audio, animation, gadget, etc.); size; web page position (such as top, left, above the fold, below the fold, etc.); inclusion method (such as being included in the HTML file for the web page, being in an IFrame in the HTML file, or being rendered by execution of a script); presentation mode (such as inline, pop-up, pop-under, pre-roll, etc.); destination landing page URL; ad server (such as DOUBLECLICK DART for ADVERTISERS or GOOGLE ADWORDS); expected click-through rate (eCTR); an ad quality score; one or more targeted keywords and/or one or more targeted publishers; and advertiser. Online advertising campaigns (which may encompass multiple advertisements at multiple publishers) may have similar attributes. As described below, particular embodiments collect information about advertisements, such as their attributes, for use by advertisers in the planning and management of their online advertising. Particular embodiments similarly collect information about online advertising campaigns.

In particular embodiments, a web server 230 includes one or more servers or other computer systems for hosting web pages or particular elements of web pages. The present disclosure contemplates any suitable web servers 230. As described above, a web server 230 may host HTML files or other file types, or may dynamically create or constitute files upon a request, and communicate them to clients 220 in response to HTTP or other requests from clients 220. In particular embodiments, a web browser at a client 220 may render a web page from one or more HTML files received from one or more web servers 230. In particular embodiments, a web server 230 may render a web page and then serve the rendered web page to a client 220 for display. When a web page renders, the browser or the server rendering the web page may retrieve one or more elements of the web page from one or more web servers 230 or ad servers 240. As an example, multiple web servers 230 operated by a single publisher may host elements of web pages of the publisher. For example, the publisher may operate one or more first web servers 230 for video, one or more second web servers 230 for text, one or more third web servers 230 for images, and one or more fourth web servers 230 for advertisements. Web servers 230 operated by the publisher may serve the domain of the publisher.

In particular embodiments, an ad server 240 includes one or more servers or other computer systems for hosting advertisements for inclusion in web pages hosted by web servers 230. The present disclosure contemplates any suitable ad servers 240. Ad serving platforms for publishers operating ad servers 240, include, for example and without limitation, DOUBLECLICK DART for PUBLISHERS, or GOOGLE ADSENSE. A web page may include elements hosted by any combination of web servers 230 and ad servers 240. When a web browser at a client 220 renders a web page, the web browser may retrieve and load one or more elements of the web page from one or more web servers 230, as directed by one or more HTML or other files for rendering the web page. The web browser may retrieve and load one or more advertisements in the web page from one or more ad servers 16, similarly as directed by the HTML or other files for rendering the web page.

In particular embodiments, application server 250 includes one or more computer servers or other computer systems, either centrally located or distributed among multiple locations, for grouping user features based on multiple types of performance measurements for an ad space. In particular embodiments, application server 250 includes hardware, software, or embedded logic components or a combination of two or more such components for carrying out the appropriate functionalities. Some of the functionalities performed by application server 250 are described in more detail below with reference to FIGS. 3 and 4.

In particular embodiments, web servers 230, ad servers 240, or application server 250 or a combination of the servers monitor and collect performance data for the advertisements placed in individual ad spaces. The performance data may be stored in a data store 270 coupled directly or indirectly to web servers 230, ad servers 240, or application server 250 by link 260. Data store 270 may be one or more data storage units. In particular embodiments, data store 270 may have suitable types of database software, such as, for example and without limitation, ORACLE DATABASE, SYBASE SQL SERVER, or MICROSOFT SQL SERVER, which are capable of managing the performance data stored in data store 270 and enabling web server 230, ad servers 240, and application server 250 to access the stored performance data. The present disclosure contemplates any suitable data store 270.

Figure 3:
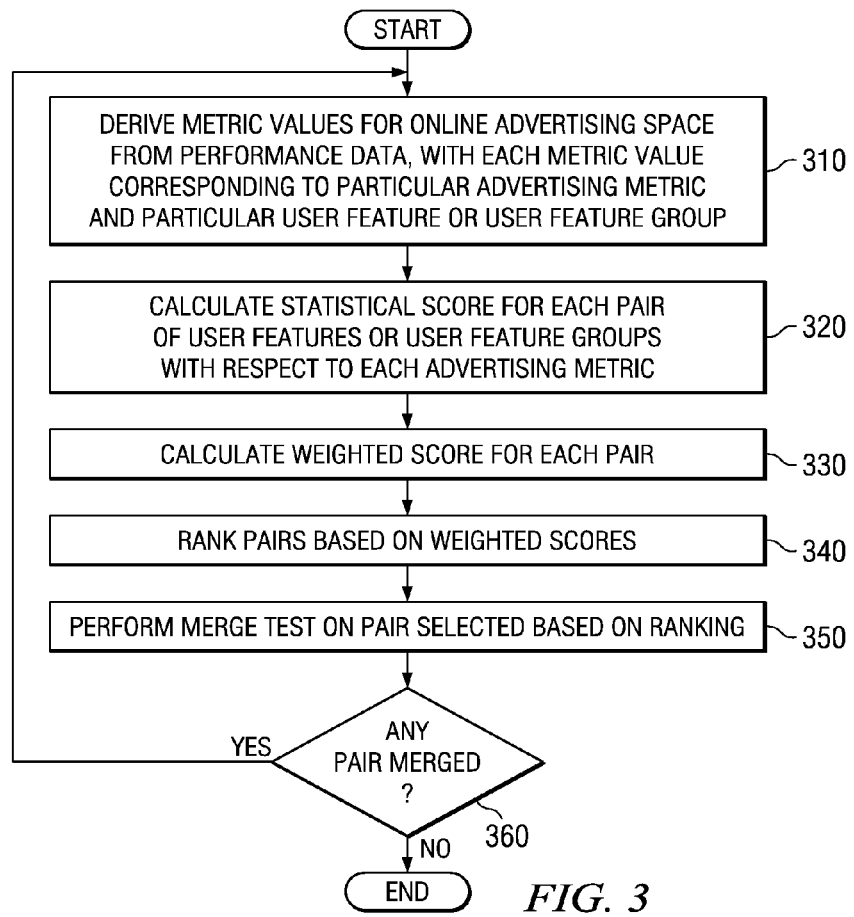
FIG. 3 illustrates an example method for grouping user features based on performance measures.

FIG. 3 illustrates an example method for grouping similar user features based on multiple types of performance measurements. Particular embodiments may implement the steps of the method of FIG. 3 as software executed at application server 250. Although the present disclosure describes and illustrates particular steps of the method of FIG. 3 as occurring in a particular order, the present disclosure contemplates any suitable steps of FIG. 3 occurring in any suitable order.

In particular embodiments, an online advertising space (ad space) is a location where advertisements may be placed and presented to the online users. Different advertisements may be placed in a particular ad space at different times for presentation to different users. Ad spaces may be contained in any suitable type of media, such as, for example, web pages, e-mail, IMs, and blogs.

In particular embodiments, performance data for a particular ad space may be monitored, collected, and stored. The performance data may be used to derive various metric values for the particular ad space. In particular embodiments, metric values are derived for one or more ad spaces from the performance data collected for the ad spaces, with each metric value corresponding to a particular advertising metric and a particular user feature or user feature group, for example, as described and illustrated with respect to Step 310 of FIG. 3. A user feature may also be referred to as a user variable.

In particular embodiments, each advertising metric represents a different type of online advertising performance measurement, including, for example and without limitation, click-through rate, conversion rate, impression-to-conversion rate, cost per impression, cost per click, cost per conversion, revenue per impression, revenue per click, and revenue per conversion. In particular embodiments, each advertising metric contains one or more metric values. In particular embodiments, each metric value of an advertising metric represents the type of online advertising performance measurement corresponding to the advertising metric with respect to a particular user feature or a particular user feature group having one or more user features.

In particular embodiments, each user feature represents a different aspect or characteristic of the online users to whom the advertisements placed in the ad space have been presented, including, for example and without limitation, the device used when viewing the advertisements presented in the ad space, the operating system of the device, the speed or bandwidth of the Internet connection, the time for viewing the advertisements presented in the ad space, and demographic information about the users such as, for example and without limitation, age, gender, ethnicity, ethnic distribution, geographical location, average population density, education field and level, profession, annual income level, financial history and derived metrics such as credit score, hobby, social group, family status, marital status, military or veteran status, websites previously visited, products or services previously viewed or purchased. In addition, user features may include user behavioral data, such as, for example and without limitation, recency, frequency, and other metrics summarizing previous website or web usage or network activities, with or without regard to the creative or advertising campaign, such as may be used for advertising retargeting.

In particular embodiments, one or more user features are grouped together to form a user feature group. In particular embodiments, the user features belonging to the same user feature group are related or similar.

Figure 4:
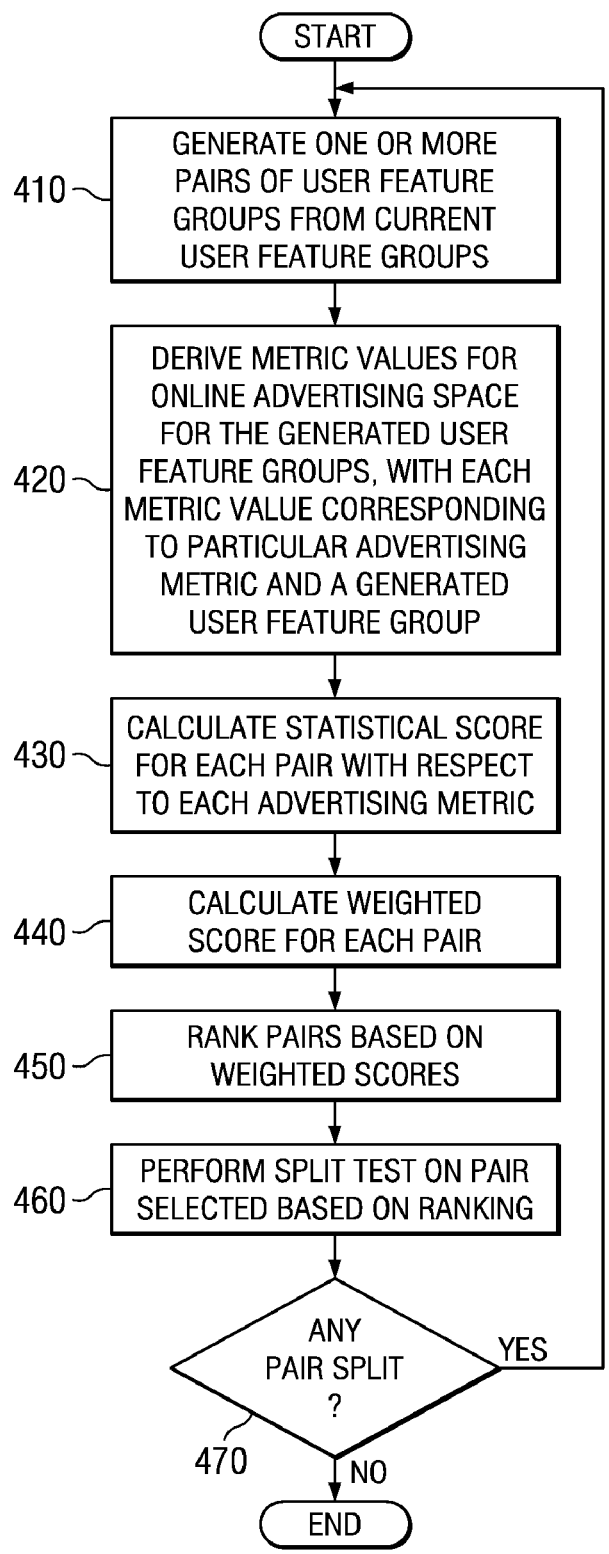
FIG. 4 illustrates another example method for grouping user features based on performance measures.

Thus, an ad space may have metric values corresponding to multiple advertising metrics and multiple user features or user feature groups. For the processes of grouping user features as illustrated in FIGS. 3 and 4, a user feature and a user feature group are often treated similarly. For example, a user feature may have multiple metric values with respect to the advertising metrics, and a user feature group may similarly have multiple metric values with respect to the advertising metrics. In fact, a single user feature may be considered the same as a user feature group having one user feature.

Consider the following example shown in TABLE 1, below.

TABLE 1

| User Dimensions | User Features or User Feature Groups | Advertising Metrics | | |
|---|---|---|---|---|
| | | $Metric_1$ click-through rate | $Metric_2$ impression-to-conversion rate | $Metric_3$ revenue per conversion ... |
| $Dimension_1$ days of a week | $Feature_{1-1}$ Monday | $MetricValue_{1-1,1}$ | $MetricValue_{1-1,2}$ | $MetricValue_{1-1,3}$ |
| | $Feature_{1-2}$ Tuesday | $MetricValue_{1-2,1}$ | $MetricValue_{1-2,2}$ | $MetricValue_{1-2,3}$ |
| | $Feature_{1-3}$ Wednesday | $MetricValue_{1-3,1}$ | | |
| | $Feature_{1-4}$ Thursday | $MetricValue_{1-4,1}$ | | |
| | $Feature_{1-5}$ Friday | $MetricValue_{1-5,1}$ | | |
| | $Feature_{1-6}$ Saturday | $MetricValue_{1-6,1}$ | | |
| | $Feature_{1-7}$ Sunday | $MetricValue_{1-7,1}$ | | |
| $Dimension_2$ age | $Feature_{2-1}$ 18 or younger | $MetricValue_{2-1,1}$ | $MetricValue_{2-1,2}$ | $MetricValue_{2-1,3}$ |
| | $Feature_{2-2}$ 19-35 | $MetricValue_{2-2,1}$ | | |
| | $Feature_{2-3}$ 36-49 | $MetricValue_{2-3,1}$ | | |
| | $Feature_{2-4}$ 50 or older | $MetricValue_{2-4,1}$ | | |
| $Dimension_3$ geographic location | $Feature_{3-1}$ Washington | $MetricValue_{3-1,1}$ | $MetricValue_{3-1,2}$ | $MetricValue_{3-1,3}$ |
| | $Feature_{3-2}$ Oregon | $MetricValue_{3-2,1}$ | | |
| | $Feature_{3-3}$ California | $MetricValue_{3-3,1}$ | | |
| | $Feature_{3-4}$ Other | $MetricValue_{3-4,1}$ | | |
| ... | | | | |

In the example shown in TABLE 1, there are multiple metrics placed along the columns of the table, each representing a different type of advertising performance measurement. For example, $Metric_1$ represents the measurement of click-through rate; $Metric_2$ represents the measurement of impression-to-conversion rate; $Metric_3$ represents the measurement of revenue per conversion; and so on.

There are multiple user features placed along the rows of the table, each representing a different aspect or characteristic of the online users. For example, some of the user features represent the different days of a week; some of the user features represent different age groups; some of the user features represent different states; and so on.

In particular embodiments, related user features may be grouped into a user dimension. In the example shown in TABLE 1, Dimension$_1$ represents the days of the week and includes seven user features, Feature$_{1-1}$ ... Feature$_{1-7}$, each corresponding to a different day of the week; Dimension$_2$ represents age and includes four user features, Feature$_{2-1}$ ... Feature$_{2-4}$, each corresponding to a different age groups; Dimension$_3$ represents geographical location and includes four user features, Feature$_{3-1}$ ... Feature$_{3-4}$, each corresponding to a different state, or "Other"; and so on. In general, user features corresponding to a given dimension may be mutually exclusive and collectively exhaustive. Particular embodiments include user features such as "Other", "Unknown", or "N/A" features to achieve this.

For clarification purposes, in general, let MetricValue$_{i-j,k}$ denote the metric value corresponding to Feature$_{i-j}$ of Dimension$_i$ and Metric$_k$.

In particular embodiments, a different statistical score is calculated for a pair of user features or user feature groups with respect to each of the advertising metrics, for example, as described and illustrated with respect to Step 320 of FIG. 3. A pair of user features or user feature groups may be referred to as a feature pair. In particular embodiments, user feature and user feature group may be mixed into the same feature pair, such that a feature pair may contain a user feature and a user feature group, two user features, or two user feature groups. In particular embodiments, the statistical scores indicate a level of confidence with respect to whether the pair of user features or user feature groups should be merged.

In particular embodiments, suitable statistical models are used to calculate the statistical scores. In particular embodiments, the statistical model used to calculate the statistical score for a particular advertising metric is selected based on the type of the metric value corresponding to the advertising metric. For example, a binomial distribution model may be used to calculate the statistical scores for the measurement of impression-to-conversion rate. A Gaussian distribution model may be used to calculate the statistical scores for the measurement of revenue per conversion. For metric values that represent binary events, a Fisher exact test and Pearson's chi-square test may be appropriate. Other statistical models include, for example and without limitation, Anderson-Darling statistical test, Kullback-Leibler divergence and Bayesian approaches.

For the binomial distribution model, the probability density function may be defined as $\binom{n}{k}p^k(1-p)^{n-k}$, where n denotes the number of events and k denotes the number of successes. The maximum likelihood estimate (MLE) for the parameter p is $$\frac{k}{n}.$$

For the Gaussian distribution model, the probability density function may be defined as $$\frac{1}{\sigma\sqrt{2\pi}}e^{\left(-\frac{(x-\mu)^2}{2\sigma^2}\right)},$$

where the MLEs for the parameters $\mu$ and $\sigma$ are given by the sample mean and the square root of the sample variance, respectively.

In addition, a likelihood ratio (LR) may be defined as $$\frac{p(x_i;\theta_1)p(x_j;\theta_2)}{p(x_i;\theta)p(x_j;\theta)},$$

where $\theta$ denotes the MLEs for the model parameters based on the combined data of $x_i$ and $x_j$, $\theta_1$ denotes the MLEs for the model parameters based on the data of $x_i$, and $\theta_2$ denotes the MLEs for the model parameters based on the data of $x_j$. The LR may indicate a confidence level that the two data sets, $x_i$ and $x_j$, are drawn from different distributions, and may use binomial distributions or Gaussian distributions.

In particular embodiments, a statistical score for a feature pair with respect to a particular advertising metric is calculated by applying a suitable statistical model to the two metric values corresponding to the two user features or user feature groups in the feature pair and with respect to the advertising metric. In particular embodiments, the LR may be one statistical score used to determine if two features or feature groups are differentiated with respect to a given metric. Suppose from TABLE 1, two user features, Monday and Tuesday, are selected to form a feature pair. Since there are three advertising metrics, representing click-through rate, impression-to-conversion rate, and revenue per conversion respectively, in this example, three statistical scores are calculated for the feature pair consisting of Monday and Tuesday, one for each of the three advertising metrics.

For clarification purposes, in general, let StatisticScore$_{i,j}$ denote the statistical score calculated for FeaturePair$_i$ with respect to Metric$_j$. If FeaturePair$_1$ denotes the pair of user features consisting of Monday and Tuesday, then StatisticScore$_{1,1}$ denotes the statistical score calculated for Metric$_1$, StatisticScore$_{1,2}$ denotes the statistical score calculated for Metric$_2$, and StatisticScore$_{1,3}$ denotes the statistical score calculated for Metric$_3$ for the feature pair Monday and Tuesday. More specifically, in particular embodiments, StatisticScore$_{1,1}$ is obtained by applying a suitable statistical model to MetricValue$_{1-1,1}$ and MetricValue$_{1-2,1}$; StatisticScore$_{1,2}$ is obtained by applying a suitable statistical model to MetricValue$_{1-1,2}$ and MetricValue$_{1-2,2}$; and StatisticScore$_{1,3}$ is obtained by applying a suitable statistical model to MetricValue$_{1-1,3}$ and MetricValue$_{1-2,3}$. Again, the same or different statistical models may be used to calculate the different statistical scores with respect to the different advertising metrics.

In particular embodiments, once the individual statistical scores have been calculated for a particular feature pair with respect to the advertising metrics, a weighted score may be calculated for the feature pair by combining the individual statistical scores. For clarification purposes, in general, let WeightedScore$_i$ denote the weighted score corresponding to FeaturePair$_i$. In particular embodiments, WeightedScore$_i$ $$WeightedScore_i = \sum_{j=1}^{j=n} w_j \times StatisticScore_{i,j},$$

where $w_j$ denotes the weight assigned to StatisticScore$_{i,j}$ corresponding to Metric$_j$ and n denotes the total number of advertising metrics. In particular embodiments, the weights assigned to the statistical scores may be user defined.

In particular embodiments, Steps 320 and 330 of FIG. 3 may repeat for different unique pairs of the user features. For example, a second feature pair may consist of user features Monday and Wednesday; a third feature pair may consist of user features Tuesday and Thursday; a fourth feature pair may consist of user features Washington and Oregon; and so on. In particular embodiments, for each unique pair of the user features, multiple statistical scores corresponding to the advertising metrics and a weighted score may be calculated.

In particular embodiments, when selecting two user features or user feature groups to form a feature pair, only the user features or user feature groups from the same dimension are selected to form a feature pair. Thus, in TABLE 1, the different days of the week may be paired with each other; the different age groups may be paired with each other; and the different states may be paired with each other. However, a particular day of the week is not paired with a particular state or a particular age group; or a particular state is not paired with a particular age group.

In particular embodiments, the unique pairs of the user features are ranked according to their respective weighted scores, for example, as described and illustrated with respect to Step 340 of FIG. 3. In particular embodiments, a merge test is performed on one or more feature pairs having relatively lower weighted scores, for example, as described and illustrated with respect to Step 350 of FIG. 3. Particular embodiments perform a merge on a feature pair having a lowest weighted score among all the unique feature pairs. Particular embodiments perform a merge test on feature pairs having a lowest weighted score among all the unique feature pairs within each dimension. Particular embodiments perform a merge test on feature pairs in ranked order based on weighted scores until a pair of features, if found, passes the merge test or until a fixed number or percentage have been examined.

To perform a merge test on a particular pair of the user features, particular embodiments compare each of the statistical scores calculated for the feature pair (as, for example, described and illustrated with respect to Step 320 of FIG. 3) against a predefined statistical threshold. In particular embodiments, the threshold values may be user defined. Same or different threshold values may be used for the different statistical scores corresponding to the different advertising metrics. If each and every one of the statistical scores is less than or equal to the corresponding statistical threshold, then the two user features or user feature groups in the pair are merged by merging the two corresponding metric values with respect to each of the advertising metrics.

For example, in TABLE 1, FeaturePair$_1$ denotes the feature pair consisting of user features Monday and Tuesday and has StatisticScore$_{1,1}$ calculated for Metric$_1$, StatisticScore$_{1,2}$ calculated for Metric$_2$, and StatisticScore$_{1,3}$ calculated for Metric$_3$. Since there are three statistical scores corresponding to three advertising metrics in this example, three statistical thresholds have been specified, one for each of the advertising metrics. In general, let Threshold$_j$ denote the statistical threshold specified for Metric$_j$, then for FeaturePair$_i$, StatisticScore$_{i,j}$ is tested against Threshold$_j$.

For FeaturePair$_1$, StatisticScore$_{1,1}$ is tested against Threshold$_1$, StatisticScore$_{1,2}$ is tested against Threshold$_2$, and StatisticScore$_{1,3}$ is tested against Threshold$_3$. If StatisticScore$_{1,1}$ is less than or equal to Threshold$_1$, StatisticScore$_{1,2}$ is less than or equal to Threshold$_2$, and StatisticScore$_{1,3}$ is less than or equal to Threshold$_3$, then the two user features in FeaturePair$_1$, Monday and Tuesday, are merged. On the other hand, if any one of the statistical scores is greater than its corresponding threshold, then the two user features in the feature pair are not merged and remain separate features.

In particular embodiments, the same set of statistical thresholds may be used to test all unique feature pairs for possible merging. For example, in TABLE 1, if FeaturePair$_2$ denotes the feature pair Monday and Wednesday and has StatisticScore$_{2,1}$ calculated for Metric$_1$, StatisticScore$_{2,2}$ calculated for Metric$_2$, and StatisticScore$_{2,3}$ calculated for Metric$_3$, then, when performing the merge test on FeaturePair$_2$, StatisticScore$_{2,1}$ is tested against Threshold$_1$, StatisticScore$_{2,2}$ is tested against Threshold$_2$, and StatisticScore$_{2,3}$ is tested against Threshold$_3$.

Suppose the two user features, Monday and Tuesday, are to be merged because their statistical scores have passed the merge test. In particular embodiments, for each of the advertising metrics, a new metric value representing the advertising performance of the merged user features is derived using the collected performance data relating to the two to-be-merged user features or user feature groups. In particular embodiments, each new metric value is derived from the underlying performance data relating to the two to-be-merged user features or user feature groups. For example, consider Metric$_1$ representing click-through rate. Click-through rate may be calculated for an ad space by dividing the number of user clicks on the advertisements presented in the ad space by the number of times the advertisements presented in the ad space are delivered (the number of impressions). Click-through rate for user feature Monday may be calculated by dividing the number of user clicks on the advertisements presented in the ad space on Mondays by the number of times the advertisements presented in the ad space are delivered on Mondays. Click-through rate for user feature Tuesday may be calculated by dividing the number of user clicks on the advertisements presented in the ad space on Tuesdays by the number of times the advertisements presented in the ad space are delivered on Tuesdays. To merge click-through rate for user features Monday and Tuesday, a new click-through rate for user features Monday and Tuesday may be calculated by dividing the number of user clicks on the advertisements presented in the ad space on both Mondays and Tuesdays by the number of times the advertisements presented in the ad space are delivered on both Mondays and Tuesdays. Merged metric values for other advertising metrics may be similarly derived using the collected performance data.

In particular embodiments, once a feature pair has been merged, a new user feature group replaces the two individual user features or user feature groups in the merged feature pair. The resulting user feature group contains all the user features from the two individual user features or user feature groups in the merged feature pair and has merged metric values obtained as described above as its metric values.

Particular embodiments may carry out Steps 310, 320, 330, 340, and 350 in multiple iterations until none of the unique pairs of the user features or user feature groups satisfies the merge condition, as, for example, described and illustrated with respect to Step 350 of FIG. 3. At the end of each iteration, if any of the unique pairs of user features or user feature group is merged, the process may begin with a next iteration, for example, as described and illustrated with respect to Step 360 of FIG. 3. If no unique pair of user features or user feature groups satisfies the merge conditions, the process ends, for example, as described and illustrated with respect to Step 360 of FIG. 3.

In particular embodiments, after two user features or user feature groups have been merged, they form a new user feature group. The resulting user feature group replaces the individual merged user features or user feature groups during the subsequent iterations for possible further merging with other user features or user feature groups. In addition, a user feature group behaves and is treated similarly as a single user feature for the purpose of the grouping process. In one sense, a single user feature may be considered as a special case of a user feature group having one user feature.

The process of grouping user features described in FIG. 3 may be considered as a "bottom up" approach. The process in FIG. 3 begins with many user features, and gradually merges selected user features that are considered sufficiently similar. An alternative process for grouping user features is described in FIG. 4, which may be considered as a "top down" approach. The process in FIG. 4 begins with one user feature group that contains all available user features, and gradually splits the selected user features that are considered sufficiently different. Similarly, particular embodiments may implement the steps of the method of FIG. 4 as software executed at application server 250. Although the present disclosure describes and illustrates particular steps of the method of FIG. 4 as occurring in a particular order, the present disclosure contemplates any suitable steps of FIG. 4 occurring in any suitable order.

Particular embodiments may perform a linear search when splitting (or attempting to split) user features. For the linear search, let f be a user-specified function that takes as input the metric values of each feature or feature group and outputs a single value and let $x_1, x_2, \ldots, x_p$ be a current set of user features or feature groups for splitting. Particular embodiments may sort the set of user features by their f value, that is by $f(metric_1(x_i), metric_2(x_i), \ldots, metric_m(x_i))$, and the new sorted ranking may be $x'_1, x'_2, \ldots$, with $x'_1$ being the highest f value and $x'_p$ being the lowest f value. All p−1 linear splits of the user features, that is $s=(x'_1, x'_2, \ldots, x'_i)$ and $s'=(x'_{i+1}, x'_{i+2}, \ldots, x'_p)$ for all i=1 . . . p−1, may be considered. In particular embodiments, f is applied to user features or feature groups for possible splitting within a same user dimension.

As described above, the "top down" approach may begin with one user feature group that contains all of the available user features and gradually split existing user feature groups into new user feature groups each of which containing user features that are sufficiently different from the user features contained in the other user feature groups. To split an existing user feature group into two or more new user feature groups, in particular embodiments, one or more pairs of new user feature groups are generated from the currently existing user feature group, for example, as described and illustrated with respect to Step 410 of FIG. 4. A pair of user feature groups may be referred to as a feature group pair. There are different ways to generate a feature group pair from a currently existing user feature group. For example, particular embodiments use a flat-clustering algorithm (such as, for example, K-means) to cluster the features within the feature group to be split into two groups of features and use this as the possible split pair. Note that it is not necessary to split the user feature groups along dimensional lines. In some cases, a newly generated user feature group may contain user features from multiple dimensions. Other times, a newly generated user feature group may contain some of the user features from a particular dimension.

When generating new feature group pairs from currently existing user feature groups for possible splitting, in particular embodiments, there is at least one feature group pair generated for each user dimension so that there is at least one pair of new user feature groups to be considered for possible split for each user dimension. For each user dimension, particular embodiments consider all possible splits of the user features corresponding to that dimension. However, this approach may be too computationally intensives at times because there are too many possible splits to consider. To address this problem, particular embodiments use the linear splitting idea described above. Alternatively, particular embodiments recursively split the user features within a user dimension by: (1) finding the best split of the user features into one user feature and the rest of the user features, and (2) finding the best split into two users features and the rest of the user features, where one of the set of two user features must be the user feature chosen in step (1).

In particular embodiments, metric values are derived for one or more ad spaces from the performance data collected for the ad spaces for each of the new user feature groups generated above, with each metric value corresponding to a particular advertising metric and a newly generated user feature group, for example, as described and illustrated with respect to Step 420 of FIG. 4. In particular embodiments, a user feature group contains one or more user features. In particular embodiments, the process initially starts with a single user feature group containing all of the possible user features regardless of to which dimension they belong. Again, for the purpose of the grouping process, a user feature group behaves and is treated the same as a user feature. In one sense, a single user feature may be considered as a special case of a user feature group having one user feature.

For clarification purposes, in general, let $MetricValue_{i,j}$ denote the metric value corresponding to $FeatureGroup_i$ and $Metric_j$.

Consider the example illustrated in TABLE 1. A single user feature group may initially be constructed that includes the seven days of the week, the four age groups, and the three states, as illustrated in TABLE 2, below.

TABLE 2

| | | Advertising Metrics | | |
|---|---|---|---|---|
| User Feature Groups | User Dimensions | $Metric_1$ click-through rate | $Metric_2$ impression-to-conversion rate | $Metric_3$ revenue per conversion . . . |
| Feature Group$_1$ Monday; Tuesday; Wednesday; Thursday; Friday; Saturday; Sunday; 18 or younger; 19-35; 36-49 | days of a week Monday; Tuesday; Wednesday; Thursday; Friday; Saturday; Sunday age 18 or younger; 19-35; 36-49 | Metric Value$_{1,1}$ | Metric Value$_{1,2}$ | Metric Value$_{1,3}$ |

TABLE 2-continued

| | | Advertising Metrics | | | |
|---|---|---|---|---|---|
| User Feature Groups | User Dimensions | Metric$_1$ click-through rate | Metric$_2$ impression-to-conversion rate | Metric$_3$ revenue per conversion | ... |
| 50 or older; Washington; Oregon; California; Other | 50 or older geographical location Washington; Oregon; California; Other | | | | |

To calculate the metric value for each of the advertising metrics, the collected performance data relating to all the user features included in the user feature group may be used. For example, to calculate click-through rate for FeatureGroup$_1$, the number of user clicks on the advertisements presented in the ad space on all seven days of the week by all users located in Washington, Oregon, and California is divided by the number of times the advertisements presented in the ad space are delivered on all seven days of the week to all users located in Washington, Oregon, and California.

Suppose from the example user feature group illustrated in TABLE 2, two new user feature groups, denoted by FeatureGroup$_2$ and FeatureGroup$_3$ respectively, are generated based on the dimensions. FeatureGroup$_2$ contains the user features relating to the days of the week, and FeatureGroup$_3$ contains the user features relating to the age groups and the three states. The two new user feature groups are illustrated below in TABLE 3. FeatureGroup$_2$ and FeatureGroup$_3$ thus forms a pair of user feature groups.

in the ad space are delivered on all seven days of the week. To calculate click-through rate for FeatureGroup$_3$, the number of user clicks on the advertisements presented in the ad space by all users located in Washington, Oregon, and California is divided by the number of times the advertisements presented in the ad space are delivered to all users located in Washington, Oregon, and California. Note that since all age groups are included in FeatureGroup$_3$, the performance data relating to all users of all ages are used to calculate the metric values for FeatureGroup$_3$.

In particular embodiments, a different statistical score is calculated for a pair of user feature groups for each of the advertising metrics, for example, as described and illustrated with respect to Step 430 of FIG. 4. In particular embodiments, the statistical scores indicate the level of confidence with respect to whether the pair of user feature groups should be split. Similar to step 320 of FIG. 3, in particular embodiments, suitable statistical models are used to calculate the statistical

TABLE 3

| | | Advertising Metrics | | | |
|---|---|---|---|---|---|
| User Feature Groups | User Dimensions | Metric$_1$ click-through rate | Metric$_2$ impression-to-conversion rate | Metric$_3$ revenue per conversion | ... |
| FeatureGroup$_2$ Monday; Tuesday; Wednesday; Thursday; Friday; Saturday; Sunday | days of a week Monday; Tuesday; Wednesday; Thursday; Friday; Saturday; Sunday | MetricValue$_{2,1}$ | MetricValue$_{2,2}$ | MetricValue$_{2,3}$ | |
| FeatureGroup$_3$ 18 or younger; 19-35; 36-50 50 or older; Washington; Oregon; California; Other | age 18 or younger; 19-35; 36-49 50 or older geographical location Washington; Oregon; California; Other | MetricValue$_{3,1}$ | MetricValue$_{3,2}$ | MetricValue$_{3,3}$ | |

In particular embodiments, the metric values corresponding to the advertising metrics are calculated for each of the new user feature groups using the collected performance data relating to all of the specific user features included in the particular user feature group.

For example, to calculate click-through rate for FeatureGroup$_2$, the number of user clicks on the advertisements presented in the ad space on all seven days of the week is divided by the number of times the advertisements presented scores and same or different statistical models may be applied to calculate the statistical scores corresponding to the different advertising metrics.

For clarification purposes, in general, let StatisticScore$_{i-j,k}$ denote the statistical score calculated for the feature group pair consisting of FeatureGroup$_i$ and FeatureGroup$_j$ with respect to Metric$_k$. For the example illustrated in TABLE 3, for FeatureGroup$_2$ and FeatureGroup$_3$, StatisticScore$_{2-3,1}$ denotes the statistical score calculated with respect to Metric$_1$, StatisticScore$_{2\text{-}3,2}$ denotes the statistical score calculated with respect to Metric$_2$, and StatisticScore$_{2\text{-}3,3}$ denotes the statistical score calculated with respect to Metric$_3$. More specifically, in particular embodiments, StatisticScore$_{2\text{-}3,1}$ is obtained by applying a suitable statistical model to MetricValue$_{2,1}$ and MetricValue$_{3,1}$; StatisticScore$_{2\text{-}3,2}$ is obtained by applying a suitable statistical model to MetricValue$_{2,2}$ and MetricValue$_{3,2}$; and StatisticScore$_{2\text{-}3,3}$ is obtained by applying a suitable statistical model to MetricValue$_{2,3}$ and MetricValue$_{3,3}$. Several examples of suitable statistical models are described above with reference to Step 320 in FIG. 3.

In particular embodiments, once the individual statistical scores have been calculated for a particular feature group pair with respect to the advertising metrics, a weighted score may be calculated for the feature group pair by combining the individual statistical scores. In particular embodiments, in general, let WeightedScore$_{i\text{-}j}$ denote the weighted score corresponding to FeatureGroup$_i$ and FeatureGroup$_j$ then WeightedScore$_{i\text{-}j}$ $$WeightedScore_{i\text{-}j} = \sum_{k=1}^{k=n} w_k \times StatisticScore_{i\text{-}j,k},$$

where $w_k$ denotes the weight assigned to

StatisticScore$_{i\text{-}j,k}$ corresponding to Metric$_k$ and n denotes the total number of advertising metrics. In particular embodiments, the weights assigned to the statistical scores may be user defined.

Particular embodiments may repeat Steps 430 and 440 of FIG. 4 for different unique pairs of user feature groups. In particular embodiments, the pairs of user feature groups are ranked according to their respective weighted scores, for example, as described and illustrated with respect to Step 450 of FIG. 4. In particular embodiments, a split test is performed on one or more feature group pairs having relatively lower or relatively higher weighted scores depending on how the weighted scores are actually computed, for example, as described and illustrated with respect to Step 460 of FIG. 4. In particular embodiments, the split test is performed on the feature group pair having the lowest or the highest weighted score among all the unique feature group pairs. Again, either the lowest or the highest weighted score may be used depending on how the weighted scores are actually computed. In particular embodiments, the split test is performed on the feature group pairs having the lowest or the highest weighted score among all the unique feature group pairs within each dimension. In particular embodiments, the split test is performed on the feature group pairs having the lowest or the highest weighted score among all the unique feature group pairs from all the dimensions.

To perform a split test on a particular pair of the user feature groups, particular embodiments may compare each of the statistical scores calculated for the feature group pair (as, for example, described and illustrated with respect to Step 430 of FIG. 4) against a predefined statistical threshold. In particular embodiments, the threshold values may be user defined. If each and every one of the statistical scores is greater than or equal to the corresponding statistical threshold, then the original user feature group is split into the two user feature groups comprising the feature group pair. Otherwise, if any one of the statistical scores is less than its corresponding statistical threshold, then the original user feature group is not split.

Suppose FeatureGroup$_1$ is to be split into FeatureGroup$_2$ and FeatureGroup$_3$. Since, as illustrated in TABLE 3, FeatureGroup$_2$ and FeatureGroup$_3$ together contain all the user features originally from FeatureGroup$_1$, FeatureGroup$_2$ and FeatureGroup$_3$ replace FeatureGroup$_1$ in the next iteration of the process.

Steps 410, 420, 430, 440, 450, and 460 of the method of FIG. 4 may be performed for multiple iterations until none of the pairs of the new user feature groups satisfies the split condition, for example, as described and illustrated with respect to Step 460 of FIG. 4. At the end of each iteration, if any of the unique pairs of the new user feature groups is split, the method begins with another iteration, for example, as described and illustrated with respect to Step 470 of FIG. 4. On the other hand, if no unique pair of the user feature groups satisfies the split condition, the process stops, for example, as described and illustrated with respect to Step 470 of FIG. 4.

In particular embodiments, once the user features have been merged or split as much as possible using the process illustrated in FIG. 3 or 4, the advertisers may then choose different combinations of the user feature groups for personalized and targeted advertising. For example, the advertisers may pay for different advertising costs for different combinations of the user feature groups.

Although the methods described in FIGS. 3 and 4 are explained with respect to a single ad space, e.g., the user features and the metric values being determined based on the performance data collected with respect to the advertisements placed in a particular ad space, the methods shown in FIGS. 3 and 4 may also be applied to performance data collected with respect to the advertisements placed in multiple ad spaces. In particular embodiments, the performance data obtained from multiple ad spaces may be aggregated, such as, for example and without limitation, along advertising categories or campaigns, feature categories or dimensions, user groups, or geographical locations. The user features and the metric values are then determined based on the aggregated performance data obtained from multiple ad spaces. Consequently, the methods described in FIGS. 3 and 4 group user features for multiple ad spaces.

Furthermore, when applying the methods described in FIGS. 3 and 4 to a set of data containing user features and metric values, it is not necessary to consider the entire set of data as a whole. Instead, in particular embodiments, the methods described in FIGS. 3 and 4 may be applied to subsets of the data separately and independently. For example, as explained above, selected user features may be grouped into various user dimensions and the user features belonging to the same user dimension are often related to each other. The methods described in FIGS. 3 and 4 may be applied to the user features from each of the user dimensions independently. Suppose there are two user dimensions, each having multiple user features. The methods described in FIGS. 3 and 4 may be used to group the user features from one of the user dimensions. Separately and independently, the methods described in FIGS. 3 and 4 may be also be used to group the user features from the other one of the user dimensions. The two processes may be performed in parallel or sequentially.

Particular embodiments may be implemented as hardware, software, or a combination of hardware and software. As an example and not by way of limitation, one or more computer systems may execute particular logic or software to perform one or more steps of one or more processes described or illustrated herein. One or more of the computer systems may be unitary or distributed, spanning multiple computer systems or multiple datacenters, where appropriate. The present disclosure contemplates any suitable computer system. In particular embodiments, performing one or more steps of one or more processes described or illustrated herein need not necessarily be limited to one or more particular geographic locations and need not necessarily have temporal limitations. As an example and not by way of limitation, one or more computer systems may carry out their functions in "real time," "offline," in "batch mode," otherwise, or in a suitable combination of the foregoing, where appropriate. One or more of the computer systems may carry out one or more portions of their functions at different times, at different locations, using different processing, where appropriate. Herein, reference to logic may encompass software, and vice versa, where appropriate. Reference to software may encompass one or more computer programs, and vice versa, where appropriate. Reference to software may encompass data, instructions, or both, and vice versa, where appropriate. Similarly, reference to data may encompass instructions, and vice versa, where appropriate.

One or more computer-readable storage media may store or otherwise embody software implementing particular embodiments. A computer-readable medium may be any medium capable of carrying, communicating, containing, holding, maintaining, propagating, retaining, storing, transmitting, transporting, or otherwise embodying software, where appropriate. A computer-readable medium may be a biological, chemical, electronic, electromagnetic, infrared, magnetic, optical, quantum, or other suitable medium or a combination of two or more such media, where appropriate. A computer-readable medium may include one or more nanometer-scale components or otherwise embody nanometer-scale design or fabrication. Example computer-readable storage media include, but are not limited to, compact discs (CDs), field-programmable gate arrays (FPGAs), floppy disks, floptical disks, hard disks, holographic storage devices, integrated circuits (ICs) (such as application-specific integrated circuits (ASICs)), magnetic tape, caches, programmable logic devices (PLDs), random-access memory (RAM) devices, read-only memory (ROM) devices, semiconductor memory devices, and other suitable computer-readable storage media.

Software implementing particular embodiments may be written in any suitable programming language (which may be procedural or object oriented) or combination of programming languages, where appropriate. Any suitable type of computer system (such as a single- or multiple-processor computer system) or systems may execute software implementing particular embodiments, where appropriate. A general-purpose computer system may execute software implementing particular embodiments, where appropriate.

Figure 5:
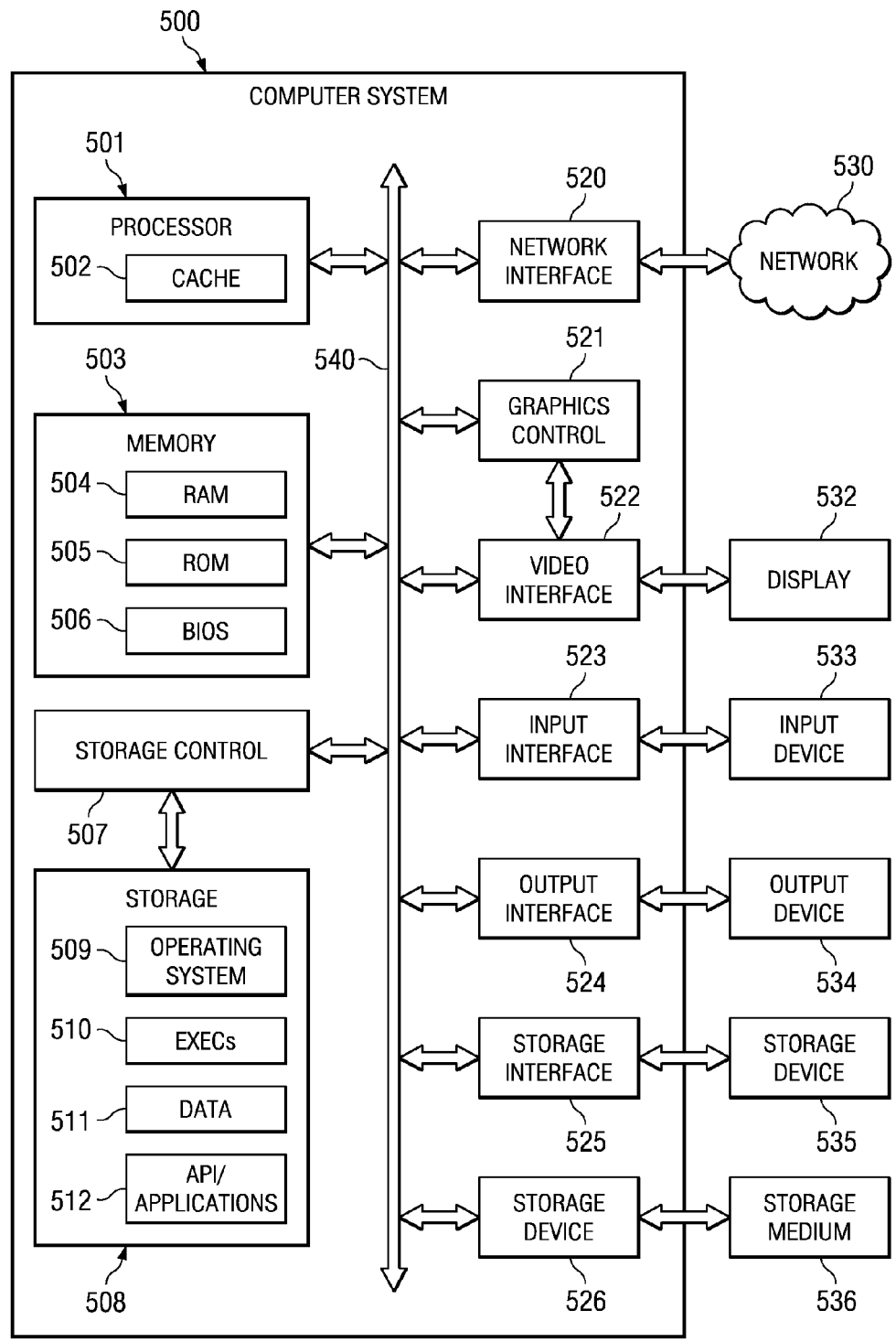
FIG. 5 illustrates an example architecture for an example computer system.

For example, FIG. 5 illustrates an example computer system 500 suitable for implementing one or more portions of particular embodiments. Although the present disclosure describes and illustrates a particular computer system 500 having particular components in a particular configuration, the present disclosure contemplates any suitable computer system having any suitable components in any suitable configuration. Moreover, computer system 500 may have take any suitable physical form, such as for example one or more integrated circuit (ICs), one or more printed circuit boards (PCBs), one or more handheld or other devices (such as mobile telephones or PDAs), one or more personal computers, or one or more super computers.

Computer system 500 may have one or more input devices 533 (which may include a keypad, keyboard, mouse, stylus, etc.), one or more output devices 534 (which may include one or more displays, one or more speakers, etc.), one or more storage devices 535, and one or more storage media 536. An input device 533 may be external or internal to computer system 500. An output device 534 may be external or internal to computer system 500. A storage device 535 may be external or internal to computer system 500. A storage medium 536 may be external or internal to computer system 500.

System bus 540 couples subsystems of computer system 500 to each other. Herein, reference to a bus encompasses one or more digital signal lines serving a common function. The present disclosure contemplates any suitable system bus 540 including any suitable bus structures (such as one or more memory buses, one or more peripheral buses, one or more a local buses, or a combination of the foregoing) having any suitable bus architectures. Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

Computer system 500 includes one or more processors 501 (or central processing units (CPUs)). A processor 501 may contain a cache memory unit 502 for temporary local storage of instructions, data, or computer addresses. Processors 501 are coupled to one or more storage devices, including memory 503. Memory 503 may include random access memory (RAM) 504 and read-only memory (ROM) 505. Data and instructions may transfer bidirectionally between processors 501 and RAM 504. Data and instructions may transfer unidirectionally to processors 501 from ROM 505. RAM 504 and ROM 505 may include any suitable computer-readable storage media.

Computer system 500 includes fixed storage 508 coupled bi-directionally to processors 501. Fixed storage 508 may be coupled to processors 501 via storage control unit 507. Fixed storage 508 may provide additional data storage capacity and may include any suitable computer-readable storage media. Fixed storage 508 may store an operating system (OS) 509, one or more executables (EXECs) 510, one or more applications or programs 512, data 511 and the like. Fixed storage 508 is typically a secondary storage medium (such as a hard disk) that is slower than primary storage. In appropriate cases, the information stored by fixed storage 508 may be incorporated as virtual memory into memory 503.

Processors 501 may be coupled to a variety of interfaces, such as, for example, graphics control 521, video interface 522, input interface 523, output interface, and storage interface 525, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 520 may couple processors 501 to another computer system or to network 530. With network interface 520, processors 501 may receive or send information from or to network 530 in the course of performing steps of particular embodiments. Particular embodiments may execute solely on processors 501. Particular embodiments may execute on processors 501 and on one or more remote processors operating together.

In a network environment, where computer system 500 is connected to network 530, computer system 500 may communicate with other devices connected to network 530. Computer system 500 may communicate with network 530 via network interface 520. For example, computer system 500 may receive information (such as a request or a response from another device) from network 530 in the form of one or more incoming packets at network interface 520 and memory 503 may store the incoming packets for subsequent processing.

Computer system 500 may send information (such as a request or a response to another device) to network 530 in the form of one or more outgoing packets from network interface 520, which memory 503 may store prior to being sent. Processors 501 may access an incoming or outgoing packet in memory 503 to process it, according to particular needs.

Particular embodiments involve one or more computer-storage products that include one or more computer-readable storage media that embody software for performing one or more steps of one or more processes described or illustrated herein. In particular embodiments, one or more portions of the media, the software, or both may be designed and manufactured specifically to perform one or more steps of one or more processes described or illustrated herein. In addition or as an alternative, in particular embodiments, one or more portions of the media, the software, or both may be generally available without design or manufacture specific to processes described or illustrated herein. Example computer-readable storage media include, but are not limited to, CDs (such as CD-ROMs), FPGAs, floppy disks, floptical disks, hard disks, holographic storage devices, ICs (such as ASICs), magnetic tape, caches, PLDs, RAM devices, ROM devices, semiconductor memory devices, and other suitable computer-readable storage media. In particular embodiments, software may be machine code which a compiler may generate or one or more files containing higher-level code which a computer may execute using an interpreter.

As an example and not by way of limitation, memory 503 may include one or more computer-readable storage media embodying software and computer system 500 may provide particular functionality described or illustrated herein as a result of processors 501 executing the software. Memory 503 may store and processors 501 may execute the software. Memory 503 may read the software from the computer-readable storage media in mass storage device 503 embodying the software or from one or more other sources via network interface 520. When executing the software, processors 501 may perform one or more steps of one or more processes described or illustrated herein, which may include defining one or more data structures for storage in memory 503 and modifying one or more of the data structures as directed by one or more portions the software, according to particular needs. In addition or as an alternative, computer system 500 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising:
   accessing by one or more computer systems online advertising data for one or more online advertising spaces for placing one or more online advertisements, the online advertising data comprising a plurality of metric values for the online advertising spaces, each of the metric values representing particular online advertising performance of the online advertising spaces with respect to a particular one of a plurality of online advertising metrics and a particular one of a plurality of user variables, each of the online advertising metrics representing a particular type of online advertising performance, each of the user variables representing a particular characteristic of online users, the online advertising spaces having metric values with respect to all the online advertising metrics and user variables;
   identifying by the one or more computer systems a plurality of pairs of the user variables, the pairs of the user variables being unique with respect to each other, each of the pairs comprising a first one of the user variables and a second one of the user variables, there being a first metric value with respect to each of the online advertising metrics and the first user variable, there being a second metric value with respect to each of the online advertising metrics and the second user variable;
   by the one or more computer systems, for each of the pairs:
      for each of the online advertising metrics, using a particular statistical model to calculate a statistical score based on the first and second metric values with respect to the online advertising metric and the first and second ones of the user variables; and
      calculating a weighted score based on all the statistical scores for the pair;
   selecting by the one or more computer systems one of the pairs based on its weighted score;
   performing by the one or more computer systems a merge test on the selected one of the pairs, the merge test comprising determining whether each of the statistical scores for the selected one of the pairs satisfies a predetermined threshold requirement for the statistical score, the selected one of the pairs passing the merge test if all the statistical scores for the selected one of the pairs satisfy their predetermined threshold requirements; and
   merging by the one or more computer systems the user variables in the selected one of the pairs with each other if the selected one of the pairs passes the merge test, the merging of the user variables in the selected one of the pairs comprising:
      for each of the online advertising metrics, combining with each other the first and second metric values with respect to the online advertising metric and the user variables in the selected one of the pairs to serve as a single merged metric value; and
      combining the user variables in the selected one of the pairs with each other to serve as a single merged user variable.

2. The method of claim 1, further comprising, if the selected one of the pairs passes the merge test, updating by the one or more computer systems the online advertising data for the online advertising spaces by:
  replacing the user variables in the selected one of the pairs with the single merged user variable; and
  replacing the metric values with respect to the online advertising metrics and the user variables in the selected one of the pairs with the merged metric values with respect to the online advertising metrics and the single merged user variable.

3. The method of claim 2, further comprising, if the selected one of the pairs passes the merge test, using by the one or more computer systems the updated online advertising data for the online advertising spaces to:
  identify new pairs of the user variables;
  for each of the new pairs, calculate new statistical scores and a new weighted score;
  select one of the new pairs based on its new weighted score;
  perform the merge test on the selected one of the new pairs;
  if the selected one of the new pairs passes the merge test:
    merge the user variables in the selected one of the new pairs; and
    repeatedly identify, perform the merge test on, and merge other new pairs of user variables until one of the other new pairs fails the merge test; and
  if the selected one of the new pairs fails the merge test, stop the merge test on all other new pairs of user variables.

4. The method of claim 2, further comprising, by the one or more computer systems:
  defining one or more advertising lines based on the user variable; and
  communicating the advertising lines to one or more ad exchanges.

5. The method of claim 1, wherein selecting one of the pairs based on its weighted score comprises selecting the one of the pairs having a lowest weighted score.

6. The method of claim 1, wherein the weighted score equals $$\sum_{i=1}^{i=n} w_i \times S_i,$$

where $S_i$ represents the $i^{th}$ one of the statistical scores for the pair, $w_i$ is a weight assigned to $S_i$, and n is a number of the statistical scores for the pair.

7. The method of claim 1, further comprising:
  if the selected one of the pairs fails the merge test, selecting by the one or more computer systems other ones of the pairs based on their weighted scores and performing merge tests on them until:
    one of the other ones of the pairs is found to pass the merge test;
    a predetermined number of the other ones of the pairs are found to fail the merge test; or
    all the other ones of the pairs are found to fail the merge test; and
  merging by the one or more computer systems the user variables in a first one, if any, of the other pairs to pass the merge test.

8. The method of claim 1, wherein:
  each of the user variables belongs to one of one or more user dimensions;
  each of the user dimensions represents a category of related ones of the user variables; and
  for each of the pair of the user variables, the first and second ones of the user variables belong to a same one of the user dimensions.

9. The method of claim 8, wherein the user dimensions comprise one or more of age, gender, profession, geographical location, education, income, ethnic distribution, average population density, client-device mode, client-device operating system (OS), bandwidth of client-device network access, or online-activity timestamp.

10. The method of claim 8, wherein the pairs of the user variables comprises one or more pairs of the user variables for each of the user dimensions, further comprising:
  for each of the user dimensions, iteratively:
    selecting one of the pairs of user variables based on its weighted score from the pairs of the user variables within the user dimension;
    performing the merge test on the selected one of the pairs; and
    merging the selected one of the pairs with each other if the selected one of the pairs passes the merge test;
  defining one or more advertising lines based on cross products of the merged user variables from each of the user dimensions.

11. The method of claim 1, further comprising deriving the metric values from online advertising performance data for the online advertising spaces.

12. The method of claim 1, wherein combining the first and second metric values with each other to serve as a single merged metric value comprises deriving the single merged metric value from online advertising performance data for the online advertising spaces that the first and second metric values were derived respectively from.

13. The method of claim 1, wherein the particular statistical model comprises a likelihood ratio test using binomial distribution or Gaussian distribution, Fisher exact test, chi-square test, Anderson-Darling statistical test, or Bayesian statistical model.

14. The method of claim 1, wherein two or more different particular statistical models are used to calculate two or more different statistical scores.

15. The method of claim 1, wherein the online advertising metrics comprise one or more of click-through rate, conversion rate, impression-to-conversion rate, revenue per impression, revenue per click, revenue per landing page visit, or revenue per conversion.

16. An apparatus comprising:
  a memory comprising instructions executable by one or more processors; and
  one or more processors coupled to the memory and operable to execute the instructions, the one or more processors being operable when executing the instructions to:
    access online advertising data for one or more online advertising spaces for placing one or more online advertisements, the online advertising data comprising a plurality of metric values for the online advertising spaces, each of the metric values representing particular online advertising performance of the online advertising spaces with respect to a particular one of a plurality of online advertising metrics and a particular one of a plurality of user variables, each of the online advertising metrics representing a particular type of online advertising performance, each of the user variables representing a particular characteristic of online users, the online advertising spaces having metric values with respect to all the online advertising metrics and user variables;

identify a plurality of pairs of the user variables, the pairs of the user variables being unique with respect to each other, each of the pairs comprising a first one of the user variables and a second one of the user variables, there being a first metric value with respect to each of the online advertising metrics and the first user variable, there being a second metric value with respect to each of the online advertising metrics and the second user variable;

for each of the pairs:
  for each of the online advertising metrics, use a particular statistical model to calculate a statistical score based on the first and second metric values with respect to the online advertising metric and the first and second ones of the user variables; and
  calculate a weighted score based on all the statistical scores for the pair;

select one of the pairs based on its weighted score;

perform a merge test on the selected one of the pairs, the merge test comprising determining whether each of the statistical scores for the selected one of the pairs satisfies a predetermined threshold requirement for the statistical score, the selected one of the pairs passing the merge test if all the statistical scores for the selected one of the pairs satisfy their predetermined threshold requirements; and merge the user variables in the selected one of the pairs with each other if the selected one of the pairs passes the merge test, the merging of the user variables in the selected one of the pairs comprising:
  for each of the online advertising metrics, combine with each other the first and second metric values with respect to the online advertising metric and the user variables in the selected one of the pairs to serve as a single merged metric value; and
  combine the user variables in the selected one of the pairs with each other to serve as a single merged user variable.

17. The apparatus of claim 16, wherein if the selected one of the pairs passes the merge test, the one or more processors are further operable when executing the instructions to update the online advertising data for the online advertising spaces by:
  replacing the user variables in the selected one of the pairs with the single merged user variable; and
  replacing the metric values with respect to the online advertising metrics and the user variables in the selected one of the pairs with the merged metric values with respect to the online advertising metrics and the single merged user variable.

18. The apparatus of claim 17, wherein if the selected one of the pairs passes the merge test, the one or more processors are further operable when executing the instructions to use the updated online advertising data for the online advertising spaces to:
  identify new pairs of the user variables;
  for each of the new pairs, calculate new statistical scores and a new weighted score;
  select one of the new pairs based on its new weighted score;
  perform the merge test on the selected one of the new pairs;
  if the selected one of the new pairs passes the merge test:
    merge the user variables in the selected one of the new pairs; and
    repeatedly identify, perform the merge test on, and merge other new pairs of user variables until one of the other new pairs fails the merge test; and
  if the selected one of the new pairs fails the merge test, stop the merge test on all other new pairs of user variables.

19. The apparatus of claim 17, wherein the one or more processors are further operable when executing the instructions to:
  define one or more advertising lines based on the merged user variable; and
  communicate the advertising lines to one or more advertisers.

20. The apparatus of claim 16, wherein, to select one of the pairs based on its weighted score, the one or more processors are operable when executing the instructions to select the one of the pairs having a lowest weighted score.

21. The apparatus of claim 16, wherein the weighted score equals $$\sum_{i=1}^{i=n} w_i \times S_i,$$

where $S_i$ represents the $i^{th}$ one of the statistical scores for the pair, $w_i$ is a weight assigned to $S_i$, and n is a number of the statistical scores for the pair.

22. The apparatus of claim 16, wherein the one or more processors are further operable when executing the instructions to:
  if the selected one of the pairs fails the merge test, select other ones of the pairs based on their weighted scores and performing merge tests on them until:
    one of the other ones of the pairs is found to pass the merge test;
    a predetermined number of the other ones of the pairs are found to fail the merge test; or
    all the other ones of the pairs are found to fail the merge test; and
  merge the user variables in a first one, if any, of the other pairs to pass the merge test.

23. The apparatus of claim 16, wherein:
  each of the user variables belongs to one of one or more user dimensions;
  each of the user dimensions represents a category of related ones of the user variables; and
  for each of the pair of the user variables, the first and second ones of the user variables belong to a same one of the user dimensions.

24. The apparatus of claim 23, wherein the user dimensions comprise one or more of age, gender, profession, geographical location, education, income, ethnic distribution, average population density, client-device mode, client-device operating system (OS), bandwidth of client-device network access, or online-activity timestamp.

25. The apparatus of claim 23, wherein the pairs of the user variables comprises one or more pairs of the user variables for each of the user dimensions, and the one or more processors are further operable when executing the instructions to:
  for each of the user dimensions, iteratively:
    select one of the pairs of user variables based on its weighted score from the pairs of the user variables within the user dimension;
    perform the merge test on the selected one of the pairs; and
    merge the selected one of the pairs with each other if the selected one of the pairs passes the merge test;

define one or more advertising lines based on cross products of the merged user variables from each of the user dimensions.

26. The apparatus of claim 16, wherein the one or more processors are further operable when executing the instructions to derive the metric values from online advertising performance data for the online advertising spaces.

27. The apparatus of claim 16, wherein, to combine the first and second metric values with each other to serve as a single merged metric value, the one or more processors are operable when executing the instructions to derive the single merged metric value from online advertising performance data for the online advertising spaces that the first and second metric values were derived respectively from.

28. The apparatus of claim 16, wherein the particular statistical model comprises a likelihood ratio test using binomial distribution or Gaussian distribution, Fisher exact test, chi-square test, Anderson-Darling statistical test, or Bayesian statistical model.

29. The apparatus of claim 16, wherein two or more different particular statistical models are used to calculate two or more different statistical scores.

30. The apparatus of claim 16, wherein the online advertising metrics comprise one or more of click-through rate, conversion rate, impression-to-conversion rate, revenue per impression, revenue per click, revenue per landing page visit, or revenue per conversion.

31. One or more computer-readable storage media embodying software operable when executed by one or more computer systems to:
   access online advertising data for one or more online advertising spaces for placing one or more online advertisements, the online advertising data comprising a plurality of metric values for the online advertising spaces, each of the metric values representing particular online advertising performance of the online advertising spaces with respect to a particular one of a plurality of online advertising metrics and a particular one of a plurality of user variables, each of the online advertising metrics representing a particular type of online advertising performance, each of the user variables representing a particular characteristic of online users, the online advertising spaces having metric values with respect to all the online advertising metrics and user variables;
   identify a plurality of pairs of the user variables, the pairs of the user variables being unique with respect to each other, each of the pairs comprising a first one of the user variables and a second one of the user variables, there being a first metric value with respect to each of the online advertising metrics and the first user variable, there being a second metric value with respect to each of the online advertising metrics and the second user variable;
   for each of the pairs:
      for each of the online advertising metrics, use a particular statistical model to calculate a statistical score based on the first and second metric values with respect to the online advertising metric and the first and second ones of the user variables; and
      calculate a weighted score based on all the statistical scores for the pair;
   select one of the pairs based on its weighted score;
   perform a merge test on the selected one of the pairs, the merge test comprising determining whether each of the statistical scores for the selected one of the pairs satisfies a predetermined threshold requirement for the statistical score, the selected one of the pairs passing the merge test if all the statistical scores for the selected one of the pairs satisfy their predetermined threshold requirements; and
   merge the user variables in the selected one of the pairs with each other if the selected one of the pairs passes the merge test, the merging of the user variables in the selected one of the pairs comprising:
      for each of the online advertising metrics, combine with each other the first and second metric values with respect to the online advertising metric and the user variables in the selected one of the pairs to serve as a single merged metric value; and
      combine the user variables in the selected one of the pairs with each other to serve as a single merged user variable.

32. The computer-readable storage media of claim 31, wherein if the selected one of the pairs passes the merge test, the software is further operable when executed by the one or more computer systems to update the online advertising data for the online advertising spaces by:
   replace the user variables in the selected one of the pairs with the single merged user variable; and
   replace the metric values with respect to the online advertising metrics and the user variables in the selected one of the pairs with the merged metric values with respect to the online advertising metrics and the single merged user variable.

33. The computer-readable storage media of claim 32, wherein if the selected one of the pairs passes the merge test, the software is further operable when executed by the one or more computer systems to use the updated online advertising data for the online advertising spaces to:
   identify new pairs of the user variables;
   for each of the new pairs, calculate new statistical scores and a new weighted score;
   select one of the new pairs based on its new weighted score;
   perform the merge test on the selected one of the new pairs;
   if the selected one of the new pairs passes the merge test:
      merge the user variables in the selected one of the new pairs; and
      repeatedly identify, perform the merge test on, and merge other new pairs of user variables until one of the other new pairs fails the merge test; and
   if the selected one of the new pairs fails the merge test, stop the merge test on all other new pairs of user variables.

34. The computer-readable storage media of claim 31, wherein the software is further operable when executed by the one or more computer systems to:
   define one or more advertising lines based on the merged user variable; and
   communicate the advertising lines to one or more advertisers.

35. The computer-readable storage media of claim 31, wherein, to select one of the pairs based on its weighted score, the software is operable when executed by the one or more computer systems to select the one of the pairs having a lowest weighted score.

36. The computer-readable storage media of claim 31, wherein the weighted score equals $$\sum_{i=1}^{i=n} w_i \times S_i,$$

where $S_i$ represents the $i^{th}$ one of the statistical scores for the pair, $w_i$ is a weight assigned to $S_i$, and n is a number of the statistical scores for the pair.

37. The computer-readable storage media of claim 31, wherein the software is further operable when executed by the one or more computer systems to:
    if the selected one of the pairs fails the merge test, select other ones of the pairs based on their weighted scores and performing merge tests on them until:
        one of the other ones of the pairs is found to pass the merge test;
        a predetermined number of the other ones of the pairs are found to fail the merge test; or
        all the other ones of the pairs are found to fail the merge test; and
    merge the user variables in a first one, if any, of the other pairs to pass the merge test.

38. The computer-readable storage media of claim 31, wherein:
    each of the user variables belongs to one of one or more user dimensions;
    each of the user dimensions represents a category of related ones of the user variables; and
    for each of the pair of the user variables, the first and second ones of the user variables belong to a same one of the user dimensions.

39. The computer-readable storage media of claim 38, wherein the user dimensions comprise one or more of age, gender, profession, geographical location, education, income, ethnic distribution, average population density, client-device mode, client-device operating system (OS), bandwidth of client-device network access, or online-activity timestamp.

40. The computer-readable storage media of claim 38, wherein the pairs of the user variables comprises one or more pairs of the user variables for each of the user dimensions, and the software is further operable when executed by the one or more computer systems to:
    for each of the user dimensions, iteratively:
        select one of the pairs of user variables based on its weighted score from the pairs of the user variables within the user dimension;
        perform the merge test on the selected one of the pairs; and
        merge the selected one of the pairs with each other if the selected one of the pairs passes the merge test;
    define one or more advertising lines based on cross products of the merged user variables from each of the user dimensions.

41. The computer-readable storage media of claim 31, wherein the software is further operable when executed by the one or more computer systems to derive the metric values from online advertising performance data for the online advertising spaces.

42. The computer-readable storage media of claim 31, wherein, to combine the first and second metric values with each other to serve as a single merged metric value, the software is operable when executed by the one or more computer systems to derive the single merged metric value from online advertising performance data for the online advertising spaces that the first and second metric values were derived respectively from.

43. The computer-readable storage media of claim 31, wherein the particular statistical model comprises a likelihood ratio test using binomial distribution or Gaussian distribution, Fisher exact test, chi-square test, Anderson-Darling statistical test, or Bayesian statistical model.

44. The computer-readable storage media of claim 31, wherein two or more different particular statistical models are used to calculate two or more different statistical scores.

45. The computer-readable storage media of claim 31, wherein the online advertising metrics comprise one or more of click-through rate, conversion rate, impression-to-conversion rate, revenue per impression, revenue per click, revenue per landing page visit, or revenue per conversion.

46. An apparatus comprising:
    means for accessing online advertising data for one or more online advertising spaces for placing an online advertisement, the online advertising data comprising a plurality of metric values for the online advertising spaces, each of the metric values representing particular online advertising performance of the online advertising spaces with respect to a particular one of a plurality of online advertising metrics and a particular one of a plurality of user variables, each of the online advertising metrics representing a particular type of online advertising performance, each of the user variables representing a particular characteristic of online users, the online advertising spaces having metric values with respect to all the online advertising metrics and user variables;
    means for identifying a plurality of pairs of the user variables, the pairs of the user variables being unique with respect to each other, each of the pairs comprising a first one of the user variables and a second one of the user variables, there being a first metric value with respect to each of the online advertising metrics and the first user variable, there being a second metric value with respect to each of the online advertising metrics and the second user variable;
    means for, for each of the pairs:
        for each of the online advertising metrics, using a particular statistical model to calculate a statistical score based on the first and second metric values with respect to the online advertising metric and the first and second ones of the user variables; and
        calculating a weighted score based on all the statistical scores for the pair;
    means for selecting one of the pairs based on its weighted score;
    means for performing a merge test on the selected one of the pairs, the merge test comprising determining whether each of the statistical scores for the selected one of the pairs satisfies a predetermined threshold requirement for the statistical score, the selected one of the pairs passing the merge test if all the statistical scores for the selected one of the pairs satisfy their predetermined threshold requirements; and
    means for merging the user variables in the selected one of the pairs with each other if the selected one of the pairs passes the merge test, the merging of the user variables in the selected one of the pairs comprising:
        for each of the online advertising metrics, combining with each other the first and second metric values with respect to the online advertising metric and the user variables in the selected one of the pairs to serve as a single merged metric value; and
        combining the user variables in the selected one of the pairs with each other to serve as a single merged user variable.

* * * * *